United States Patent
Lee et al.

(10) Patent No.: US 9,209,668 B2
(45) Date of Patent: Dec. 8, 2015

(54) SPINDLE MOTOR HAVING AN ELECTROSTATIC DISCHARGE PATH

(75) Inventors: Jong Hoon Lee, Incheon (KR); Chang Seob Song, Seoul (KR)

(73) Assignee: SAMHONGSA CO., LTD. (KR)

( * ) Notice: Subject to any disclaimer, the term of this patent is extended or adjusted under 35 U.S.C. 154(b) by 211 days.

(21) Appl. No.: 14/003,072

(22) PCT Filed: Mar. 12, 2012

(86) PCT No.: PCT/KR2012/001770
§ 371 (c)(1),
(2), (4) Date: Sep. 4, 2013

(87) PCT Pub. No.: WO2012/124951
PCT Pub. Date: Sep. 20, 2012

(65) Prior Publication Data
US 2013/0342055 A1    Dec. 26, 2013

(30) Foreign Application Priority Data
Mar. 14, 2011  (KR) .................... 10-2011-0022458

(51) Int. Cl.
| | |
|---|---|
| G11B 33/14 | (2006.01) |
| G11B 17/028 | (2006.01) |
| H02K 5/167 | (2006.01) |
| H02K 11/00 | (2006.01) |
| G11B 19/20 | (2006.01) |

(52) U.S. Cl.
CPC ........ *H02K 11/0089* (2013.01); *G11B 17/0282* (2013.01); *G11B 19/2009* (2013.01); *G11B 33/1493* (2013.01); *H02K 5/1675* (2013.01)

(58) Field of Classification Search
CPC ............. H02K 11/0089; H02K 5/1675; G11B 17/0282
USPC .......................................................... 310/90
See application file for complete search history.

(56) References Cited

U.S. PATENT DOCUMENTS 5,998,900 A * 12/1999 Wang .............................. 310/91
6,864,615 B2    3/2005 Vacheron et al.
(Continued)

FOREIGN PATENT DOCUMENTS

| | | |
|---|---|---|
| EP | 0735645 | 10/1996 |
| JP | 2003314534 | 11/2003 |
| JP | 2010043666 | 2/2010 |

(Continued)

OTHER PUBLICATIONS

International Search Report—PCT/KR2012/001770 dated Sep. 19, 2012.

*Primary Examiner* — Terrance Kenerly
(74) *Attorney, Agent, or Firm* — Cantor Colburn LLP (57) ABSTRACT

Provided is a spindle motor having an electrostatic discharge (ESD) path that can stably discharge electric charges introduced from the outside to a rotating shaft through a base plate, in a structure of forming a bearing housing by using a resin and insert-molding the base plate. The spindle motor includes: a rotor to the central portion of which one end of a rotating shaft is coupled; a bearing that rotatably supports the rotating shaft; a bearing housing that accommodates the bearing in the inside of a groove and that is made of a resin; and a base plate whose inner circumferential portion is buried and combined in the inside of the bearing housing, wherein part of the base plate is in contact with the bearing to thus discharge externally introduced static electricity through the rotating shaft, bearing, and the base plate.

8 Claims, 4 Drawing Sheets

(56) References Cited

U.S. PATENT DOCUMENTS

| | | |
|---|---|---|
| 7,239,062 B2 | 7/2007 | Vacheron et al. |
| 2009/0021087 A1* | 1/2009 | Kitamura et al. ............... 310/43 |

FOREIGN PATENT DOCUMENTS

| | | |
|---|---|---|
| KR | 1020100043525 | 4/2010 |
| KR | 101063340 | 9/2011 |

* cited by examiner

SPINDLE MOTOR HAVING AN ELECTROSTATIC DISCHARGE PATH

TECHNICAL FIELD

The present invention relates to a spindle motor having a path of discharging static electricity, and more particularly to, a high-speed rotating spindle motor in which when a bearing housing is injection-molded by using a resin, a base plate is insert-molded to be integrated with the bearing housing, to thereby secure verticality of both a bearing that is assembled with the bearing housing and a rotating shaft, and to thereby also secure an effective electrostatic discharge (ESD) path, and to thus promote reduction of manufacturing costs and efficiency of a manufacturing process.

BACKGROUND ART

Typically, optical disc players such as LDPs, CDPs, CD-ROM and DVD-ROM players, DVD players, and BD and 3D players, are apparatuses including operations of: loading a disc onto a turntable by a loading mechanism; clamping, fitting and fixing a mounting hole formed at the center of the disc with a chuck that is a clamping unit; rotating the disc clamped in the chuck in one direction by a drive source of a spindle motor drive unit; and reproducing information recorded on the disc by an optical pickup unit that moves in a radial direction of the disc.

In general, the spindle motor maintains a constant contact section between the bearing and the rotating shaft, to thereby rotatably support the rotating shaft and to thus maintain high accuracy rotational characteristics, with a result of being widely employed as a hard disc drive (HDD), optical disc drive (ODD) and a driving unit for driving other recording media requiring high-speed rotation.

Figure 1:
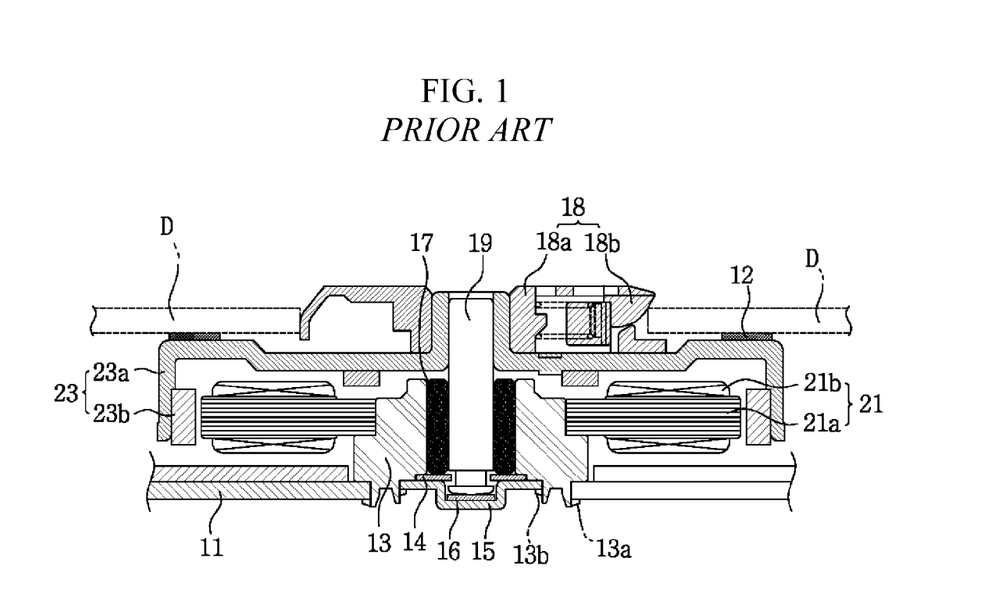
FIG. 1 is an axial cross-sectional view showing a conventional spindle motor having a press-fitting structure.

The spindle motor requiring high-speed rotation becomes thinner and lighter to meet development of ever-smaller electronic devices, and an example of the spindle motor is schematically shown in FIG. 1 (see Korean Laid-open Patent Publication No. 10-2010-0043525).

FIG. 1 is a cross-sectional view of a conventional spindle motor. As shown, the conventional spindle motor is combined by inserting an outer circumferential surface of the lower end of a bearing housing 13 into a coupling hole formed in a base plate 11 to thus spinning or caulking an outer protrusion 13a. Stoppers 14 and a cap 15 are coupled on an inner circumferential surface of the lower end of the bearing housing 13, in order to prevent a rotating shaft 19 from seceding, in which the cap 15 is combined by spinning or caulking an inner protrusion 13b of the lower end of the bearing housing 13.

A bearing 17 is fixed in the bearing housing 13 and the rotating shaft 19 is supported by the bearing 17, in which the rotating shaft 19 is rotatably supported by the bearing 17. A support washer 16 that is provided in the lower end of the rotating shaft 19 to reduce a rotational resistance of the rotating shaft 19 is disposed in the cap 15.

In addition, a stator 21 having a core 21a and a coil 21b is fixed on the outer circumferential surface of the bearing housing 11, and a rotor 23 having a rotor yoke 23a and a magnet 23b is fixed on the leading end of the rotating shaft 19.

The upper surface of the rotor yoke 23a of the rotor 23 plays a role of a turntable on which a disc D storing data is secured and seated. To this end, a rubber ring 12 is arranged on the outside of the upper surface of the rotor yoke 23a to thus prevent the disc D from slitting, and a chucking device 18 having a disc chuck 18b and a chuck case 18a is provided on the inside of the upper surface of the rotor yoke 23a to thus secure the loaded disc D.

The conventional spindle motor generates a rotating magnetic field when an electric current is supplied to the coil 21b, and thus the magnet 23b, that is, the rotor 23 rotates by an electromagnetic force 23b that is formed between the coil 21b and the magnet 23b, to thus enable the disc D mounted on the rotor yoke 23a to rotate.

In the case of the conventional spindle motor, since the coupling between the bearing housing 13 and the base plate 11 and the coupling between the bearing housing 13 and the cap 15 are accomplished by a spinning or caulking process of the outer and inner protrusions 13a and 13b, an assembly process becomes complicated.

In addition, when a spinning or caulking process is executed in order to perform a bonding process between the bearing housing 13 and each of the base plate 11 and the cap 15, in the conventional art, a mismatch of the verticality of the bearing housing 13 with respect to the base plate 11 will occur. As a result, when the bearing 17 is press-fitted into the bearing housing 13, a run-out problem from the verticality of the bearing 17 may occur to accordingly require a repair the run-out problem. In this case, if the rotating shaft 19 is assembled with the bearing 17 without repairing, the rotating shaft 19 is tilted from the base plate 11, and thus vibration and noise may occur.

Moreover, when the bearing 17 is press-fitted into the bearing housing 13, an inner diameter portion of the bearing 17 may change by the press-fitting force. As a result, in order to correct the change in the inner diameter portion of the bearing 17, machining of the inner diameter portion of the bearing 17 is required by a sizing process.

In addition, when a spinning or caulking process of joining the cap 15 to the bearing housing 13 is poor, oil of the bearing 17 may leak through a contact portion between the bearing housing 13 and the cap 15.

Moreover, in the conventional spindle motor, the bearing housing 13 is machined or manufactured by an extrusion process, in a CNC (Computer Numerical Control) machine by using a brass or aluminum material, to thus cause disadvantages of increasing a manufacturing cost.

Typically, various kinds of electronic devices are wounded to prevent damage to the devices due to electric shocks such as the external lightning or static electricity. In addition, the spindle motors and the disc drive devices using the spindle motors are grounded, and the spindle motors are configured to discharge electric charges due to static electricity to the outside by mounting a base plate in a disc drive unit and simultaneously through a main body of the disc drive unit.

In other words, as shown in FIG. 1, the conventional spindle motor is configured so that the base plate 11 made of metal is in mutual contact with the rotating shaft 19 through the bearing housing 13 and the bearing 17, to thus form an electrostatic discharge path.

The slim spindle motor is mounted in a notebook or laptop computer. In this case, when a disc is loaded or unloaded from the notebook or laptop computer, the spindle motor is exposed to the outside together with a tray.

As described above, when the spindle motor is exposed to the outside and then a user loads a disc on a turntable, the rotating shaft of the spindle motor acts as a lightning rod. In addition, even if the electric charges due to the electrostatic discharge (ESD) are introduced into the spindle motor through the rotating shaft, the electric charges are discharged into the main body of the disc drive unit through the electrostatic discharge path and discharged to the ground. As a result, the conventional spindle motor did not cause a problem that a drive IC (Integrated Circuit) of the motor drive circuit was damaged due to the electrostatic discharge (ESD).

Meanwhile, in the case of a DVD (Digital Versatile Disc) of a half height drive for recording the DVD, it is a current trend that a disc recording speed increases to have a recording speed of 16-times to 20-times or higher. To improve such a recording speed, the maximum rotational speed of the spindle motor should be secured to be 10,500 RPM or higher. In the case that the rotational speed of the spindle motor is enhanced as described above, the verticality of the rotating shaft becomes even more important.

Figure 2:
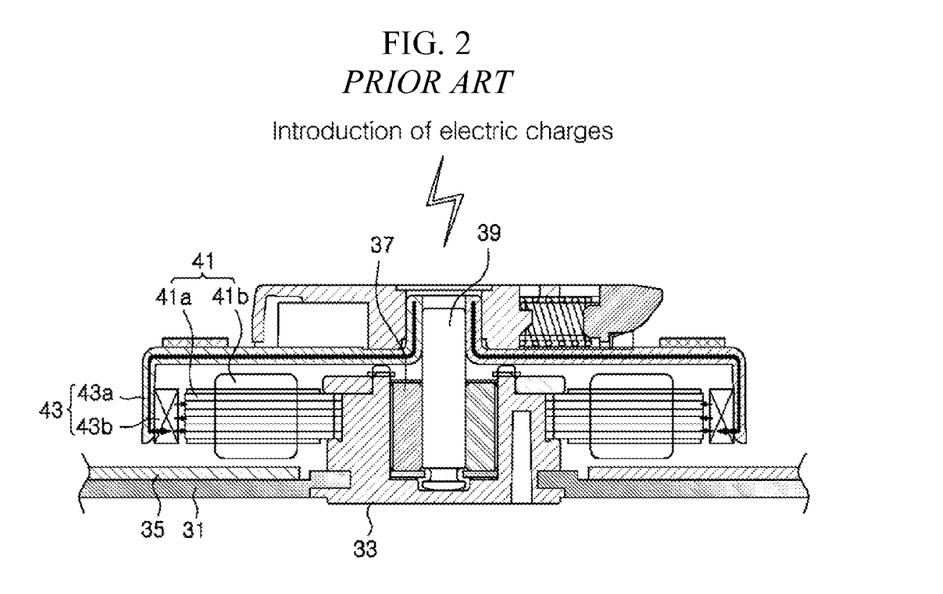
FIG. 2 is an axial cross-sectional view showing a spindle motor having a bearing housing of a resin molding structure.

To solve the problem of the conventional spindle motor, the spindle motor was proposed in Korean Patent Application No. 10-2010-0111374 on Nov. 10, 2010 by the same applicant as that of this invention, in which a bearing housing 33 is formed by using a resin and simultaneously a base plate 31 is integrated with the bearing housing 33 by means of an insert-molding, hot-melting, or bonding process, to thereby secure verticality of both a bearing 37 that is assembled with the bearing housing 33 and a rotating shaft 39, and to thereby also essentially block the leakage of oil from the bearing 37, and to thus have the advantage of simplifying an assembly process (FIG. 2).

However, in the case that the slim spindle motor that is illustrated in FIG. 2 is mounted in the notebook or laptop computer, the spindle motor may be exposed to the outside together with a tray, when a disc is loaded or unloaded from the notebook or laptop computer.

As described above, when the spindle motor is exposed to the outside and then a user loads a disc on a turntable, the rotating shaft 39 of the spindle motor acts as a lightning rod as shown in FIG. 2, and the electric charges due to the electrostatic discharge (ESD) may be introduced into the spindle motor through the rotating shaft 39. In this case, the electric charges introduced into the rotating shaft 39 can be transferred through metal components such as a bearing 37 and a rotor case 43a made of metal and being contact with the rotating shaft 39. However, since the bearing 37 is wrapped by the bearing housing 33 made of a resin and thus does not secure an electrostatic discharge path, the electric charges move to a magnet 43 along the rotor case 43a made of a magnetic path forming material (i.e., metal).

In this case, the electric charges do not proceed further in the magnet 43 and then are sufficiently collected in the magnet 43, so as to be beyond a charging capacity of a conductor. As a result, an electric charge jumping phenomenon occurs in which the electric charges are temporarily jumped to a coil 41a wound on an adjacent core 41b.

As a result, the electric charges jumped onto the coil 41a of a stator 41 may inflict a damage on a disc drive IC of the motor drive circuit. The damaged drive IC may cause a malfunction of the spindle motor or a stop of the driving of the motor, which obstructs an optical disc player device from playing a normal role.

DISCLOSURE

Technical Problem

To solve the above problems or defects, it is an object of the present invention to provide a spindle motor in which a bearing housing is formed by using a resin and simultaneously a base plate is insert-molded to thus be integrated with the bearing housing, to thereby secure verticality of both a bearing that is assembled with the bearing housing and a rotating shaft, and to thereby also secure an effective electrostatic discharge (ESD) path.

It is another object of the present invention to provide a slim spindle motor that is grounded, and that secures an electrostatic discharge (ESD) path through a base plate a disc drive unit in which a spindle motor is mounted, to thereby prevent a drive IC of a motor drive circuit from being damaged and to also promote reduction of a manufacturing cost and efficiency of a manufacturing process.

It is still another object of the present invention to provide a spindle motor in which an inner protrusion of a base plate that is insert-molded into a bearing housing forms a structure of supporting a metal bearing, to thereby easily manage a process of press-fitting the metal bearing into the bearing housing, and the metal bearing is easily press-fitted and assembled to the bottom of the bearing housing at the time of press-fitting the metal bearing, to thereby easily meet flatness and effectively secure verticality of the metal bearing and a rotating shaft.

The objects of the present invention are not limited to the above-described objects, and other objects and advantages of the present invention can be appreciated by the following description and will be understood more clearly by embodiments of the present invention. In addition, it will be appreciated that the objects and advantages of the present invention will be easily realized by means shown in the appended patent claims, and combinations thereof.

Technical Solution

To accomplish the above and other objects of the present invention, according to an aspect of the present invention, there is provided a spindle motor comprising: spindle motor comprising: a rotor to the central portion of which one end of a rotating shaft is coupled; a bearing that rotatably supports the rotating shaft; a bearing housing that accommodates the bearing in the inside of a groove and that is made of a resin; and a base plate whose inner circumferential portion is buried and combined in the inside of the bearing housing, wherein part of the base plate is in contact with the bearing to thus discharge externally introduced static electricity through the rotating shaft, bearing, and the base plate.

Preferably but not necessarily, part of the base plate is in contact with the bottom of the bearing or the outer circumference of the lower end of the bearing.

Preferably but not necessarily, the base plate comprises a plurality of protrusions projected from the inner circumferential surface of a through-hole formed in the base plate, to increase a bonding force to the bearing housing when the base plate insert-molded into the bearing housing, and wherein at least one of the plurality of protrusions is in contact with the bearing.

Preferably but not necessarily, the at least one protrusion in contact with the bearing is in contact with the bottom surface of the bearing or the outer circumference of the lower end of the bearing.

Preferably but not necessarily, the base plate comprises: a flat portion that is fixed on a main body of a disc drive unit; and an extension portion that is bent upwardly from the flat portion and then extended in parallel to the flat portion to increase a bonding force for the bearing housing, and wherein the extension portion comprises a number of protrusions that are contact with the bearing and that are projected from the inner circumferential surface of a through-hole formed at the center thereof.

Preferably but not necessarily, the protrusions are set at the same level as that of a slit washer to prevent the rotating shaft from seceding from the metal bearing.

Preferably but not necessarily, the base plate comprises: a flat portion that is fixed on a main body of a disc drive unit; and a coupling ring that is bent upwardly from the inner end of the flat portion and whose inner circumferential surface is exposed to a recess of the bearing housing and in which the lower side of the bearing is press-fitted and coupled.

Preferably but not necessarily, the spindle motor further comprises a tilt portion that is bent obliquely from the flat portion to connected the flat portion with the coupling ring, in which a through-hole is formed to form an empty recess when the bearing housing is injection-molded with a resin.

Preferably but not necessarily, the coupling ring is set to form verticality with respect to the flat portion of the base plate to secure verticality of the bearing and the rotating shaft that are coupled therein.

Advantageous Effects

As described above, according to the present invention, a spindle motor is configured to have a bearing housing of a resin molding structure that maintains verticality of a rotating shaft and essentially blocks leaks of a hearing oil, in which the bearing housing includes a ground structure for an electrostatic discharge (ESD) path that is naturally connected to a base plate through an inner tip of the base plate that is in contact with a metal bearing, to thus discharge the electric charges that are passed into the interior of the spindle motor from the rotating shaft due to the externally introduced static electricity, and to thereby have advantages of preventing in advance a drive IC of a motor drive circuit from being damage or malfunctioning, or the motor from stopping due to the external electric charges.

In addition, the present invention is configured to have a structure that an inner protrusion of a base plate that is insert-molded into a hearing housing supports a metal bearing, to thereby easily manage a process of press-fitting the metal bearing into the bearing housing, and the metal bearing is easily press-fitted and assembled to the bottom of the bearing housing at the time of press-fitting the metal bearing, to thereby easily meet flatness and effectively secure verticality of the metal bearing and a rotating shaft.

BEST MODE

Hereinafter, spindle motors according to respective preferred embodiments of the present invention will be described in detail with reference to the accompanying drawings.

First, the present invention can be applied to low-speed rotating motors as well as spindle motors requiring high-speed rotation, and applied to both brushless DC motors and brush-type DC motors. An embodiment of the present invention will be described below with an example of a preferred embodiment that is applied to a BLDC type spindle motor, for example.

The entire configuration of a spindle motor having a resin molding structure will be first described, and then an electrostatic discharge (ESD) structure will be described.

Figure 3:
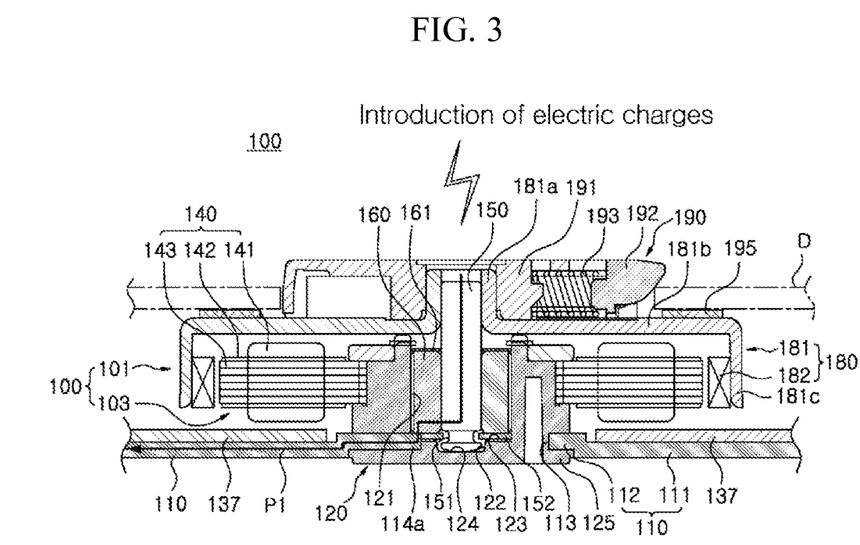
FIG. 3 is an axial cross-sectional view showing an ultra-thin spindle motor having an electrostatic discharge (ESD) path according to a first embodiment of the present invention.
Figure 4:
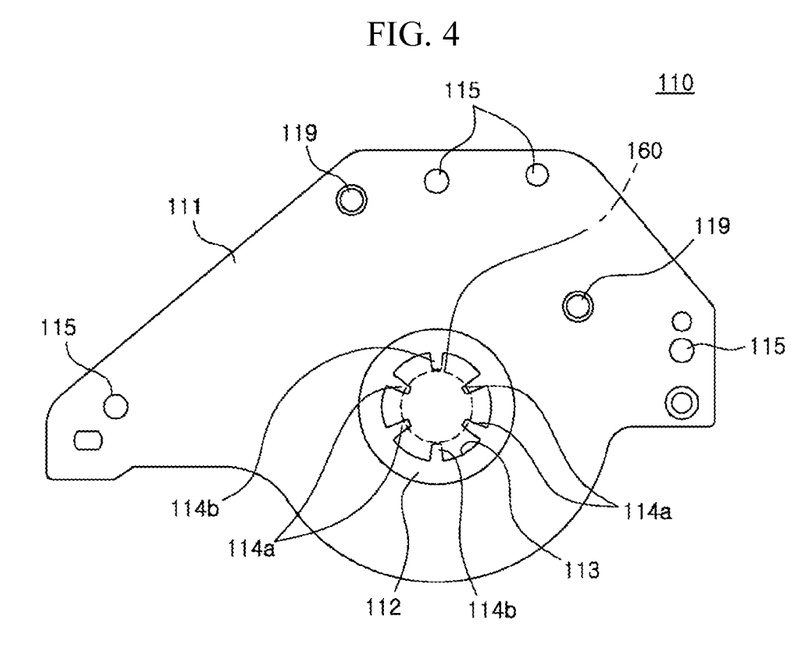
FIG. 4 is a plan view showing a base plate shown in FIG. 3.

Referring to FIGS. 3 to 4, an ultra-thin spindle motor 100 having an electrostatic discharge (ESD) path P1 according to a first embodiment of the present invention greatly includes a stator (or an armature) 140 and a rotor 180 of an outer rotor type.

The stator 140 has a structure having a core 141 including a plurality of teeth that are radially projected from a ring-shaped body, in which a bobbin 142 made of an insulator is formed in each tooth of the core 141, and a coil 143 is wound on the outside of the bobbin 142.

The rotor 180 includes an inverted cup-shaped rotor case 181 made of a magnetic path forming material, and a ring-shaped magnet 182 where a plurality of N-pole and S-pole magnets are alternately arranged or a plurality of N-pole and S-pole are split and magnetized.

The rotor case 181 includes: a circular cover plate 181b that plays a role of a turntable on which a disc D storing data, that is, a recording medium is secured and seated; a downward bent portion 181c that is bent downward from the leading end of the cover plate so as to face the outer circumference of the stator 140 and on the inner circumferential surface of which a magnet 182 is attached; and an upward bent portion 181a that is protruded upward so as to be stably coupled with a rotating shaft 150 to be described later at the central portion of the cover plate.

A disc support 195 made of a rubber ring to prevent a disc D from slitting is arranged on the outside of the circular cover plate 181b, and a chucking device 190 having three disc chucks 192 for elastically supporting a leading end of the disc D by a spring 193 to fix the disc D to be loaded, and a circular chuck case 191 for supporting the chucks is arranged on the inside of the circular cover plate 181b. The central portion of the chuck case 191 is coupled with and supported by the upward bent portion 181a of the rotor case 181.

The spindle motor 100 as constructed above generates a rotating magnetic field when an electric current is supplied to a two-phase or three-phase coil 143, and thus the magnet 182, that is, the rotor 180 is rotated by an electromagnetic force formed between the coil 143 and the magnet 182, to thereby cause rotation of the disc D mounted on the rotor case 181.

Meanwhile, the spindle motor 100 according to the present invention includes a rotating body 101 having the rotor 180 and the chucking device 190 and on the central portion of which a rotating shaft 150 is combined, and a fixed body 103 that rotatably supports the rotating shaft 150 combined on the central portion of the rotating body 101.

The stator 140 is combined on the upper side of the outer circumference of the fixed body 103, and the inner circumference of the base plate (or a bracket) 110 is integrally combined on the fixed body 103. The fixed body 103 includes the bearing housing 120 in which a metal bearing 160 is combined into a first recess 121 formed on the inner circumference of the bearing housing 120. The rotating shaft 150 combined on the center of the rotating body 101 is rotatably supported by the metal bearing 160.

As shown in FIG. 4, the base plate 110 fixedly supports the fixed body 103 as a whole, and may be fabricated in various shapes so that the base plate 110 may be fixedly mounted on a variety of disc drive devices on which the spindle motor 100 is mounted. For this, the base plate 110 includes holes 115 with which a number of screws or bolts are coupled.

In addition, the base plate 110 is placed on the lower side of the stator 140, and further includes at least one fixing hole 119 for fixing a printed circuit board (PCB) 137 that applies a drive signal to the stator 140 by using a caulking method or the like. The drive signal for controlling the spindle motor 100 is applied to the printed circuit board (PCB) 137 from the main body of the disc drive device, for example, through a flexible flat cable (FFC).

In this case, the base plate 110 is integrally formed with the bearing housing 120, in an insert-injection method or insert-molding method, at the time of making the bearing housing 120 that is injection-molded by using, for example, a thermoplastic or thermosetting resin.

A part of the inner portion of the base plate 110 is buried into a first outer diameter portion 125 that is located at the lower end of the outer circumference of the bearing housing 120 in an insert-injection method during injection molding the bearing housing 120, and is integrally formed with the bearing housing 120. In this case, the bearing housing 120 may be made by an injection molding method by using a thermosetting resin or a thermoplastic resin such as an engineering plastic material such as nylon 66 or polycarbonate (PC).

Moreover, the metal bearing 160 is coupled into a first cylindrical recess 121 formed on the inner circumference of the bearing housing 120. A circular through-hole is provided at the central portion of the metal bearing 160. Accordingly, the rotating shaft 150 is rotatably coupled with the metal bearing 160. In this case, the bottom of the rotating shaft 150 is inserted into a second recess 122 of a second diameter formed at the central portion of f the first recess 121 and is supported on a bottom surface 124 of the second recess 122. In addition, a slit washer 152 whose inner circumference is inserted into the recessed portion 151 of the lower side of the rotating shaft 150, is disposed on the bottom of the first recess 121, in order to suppress the rotating shaft 150 of the rotor 180 from seceding from the metal bearing 160.

In addition, an oil shatterproof washer 161 for preventing oil in the bearing from scattering is coupled at the entrance of the first recess 121 of the bearing housing 120 of the upper side of the bearing 160.

The present invention includes an electrostatic discharge (ESD) path P1 that discharges external electric charges introduced into the rotating shaft 150 due to externally introduced static electricity to the base plate 110 through the metal bearing 160 contacting the rotating shaft 150, in a resin molding structure of the bearing housing as constructed above.

In this case, the electrostatic discharge path P1 is not limited to the above-described spindle motor, but may be applied to any spindle motors employing a resin molding structure of the bearing housing 120 made of a resins and the metallic base plate 110 that is insert-molded into the bearing housing 120.

Referring to FIGS. 3 and 4, the base plate 110 is made of a conductor by considering a grounding function, and may be preferably made of a durable iron-based alloys.

For example, the base plate 110 includes: a flat portion 111; and an extension portion 112 that is bent upward from the flat portion 111 and then is extended and molded in parallel with the flat portion 111 in order to increase a binding force with the bearing housing 120.

In this case, the extension portion 112 includes a number of, for example, six first and second protrusions 114a and 114b that are protruded in a mutually different length toward the center of a through-hole 113 formed at the center of the extension portion 112, in order to increase a contact area between the base plate 110 and the bearing housing 120 at the time of an inert-molding process.

The four first protrusions 114a of the six first and second protrusions 114a and 114b are extended longer by a predetermined length than the remaining two second protrusions 114b. As described above, the first protrusions 114a are made to be naturally in contact with the bottom surface of the metal bearing 160 that acts as a conductor and to stably support the metal bearing 160, by extending the lengths of the four first protrusions 114a.

Accordingly, the electrostatic discharge path P1 of the static electricity that occurs and then is introduced into the spindle motor 100 leads to the rotating shaft 150, the metal bearing 160, the first protrusion 114a, and the base plate 110.

Therefore, in the present invention, the electric charges that cause the static electricity are introduced into the motor 100, and then discharged to the outside through a typical internal grounding structure of the disc drive unit from the base plate 110 along the electrostatic discharge path P1. Accordingly, since the electric charges introduced into the motor 100 are discharged to the disc drive unit through the base plate 110 before moving to the coil through the rotating shaft, the rotor case, and the magnet, a problem of damaging the drive IC of the motor drive circuit may be solved.

In the first embodiment, the first protrusions 114a that are made to be in contact with the metal bearing 160 are limited to four, but are not limited to four. Forming at least one first protrusion 114a may suffice. However, it is more preferable to provide two first protrusions 114a or more.

In the first embodiment, when the base plate 110 is insert-molded and integrated with the bearing housing 120, part of the first protrusion 114a of the base plate 110 that contacts the bottom of the metal bearing 160 is preferably protruded into the first recess 121 of the bearing housing 120, and part of the protruded first protrusion 114a is set in the same level as that of a slit washer 152, so as to promote a stable support of the metal bearing 160.

As described above, since the inner protrusion 114a of the base plate 110 forms a structure of supporting the metal hearing 160, a process of press-fitting the metal bearing 160 into the bearing housing 120 can be easily managed.

In other words, when the metal bearing 160 is press-fitted and assembled into the first recess 121 of the bearing housing 120, the metal bearing 160 is easily press-fitted to the bottom of the first recess 121, to thus easily meet flatness and to thereby secure verticality of the metal bearings and rotating shaft.

Figure 5:
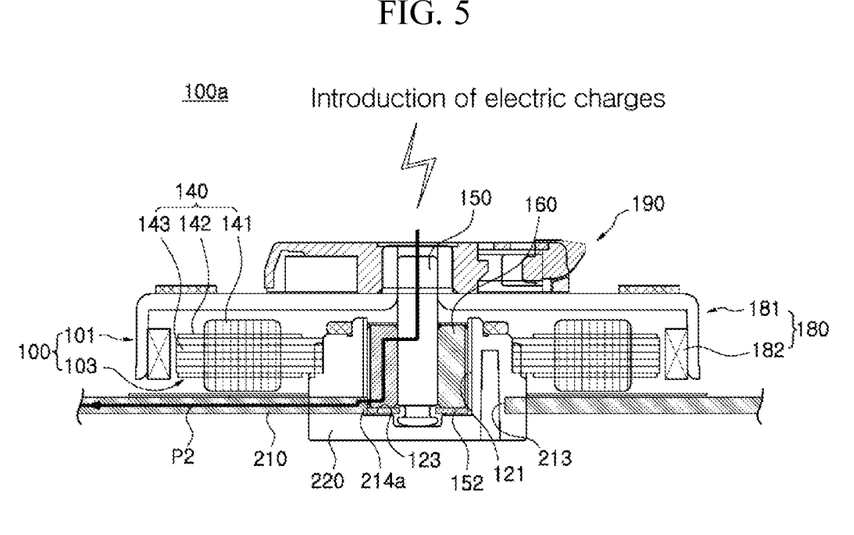
FIG. 5 is an axial cross-sectional view showing an ultra-thin spindle motor having an electrostatic discharge (ESD) path according to a second embodiment of the present invention.
Figure 6:
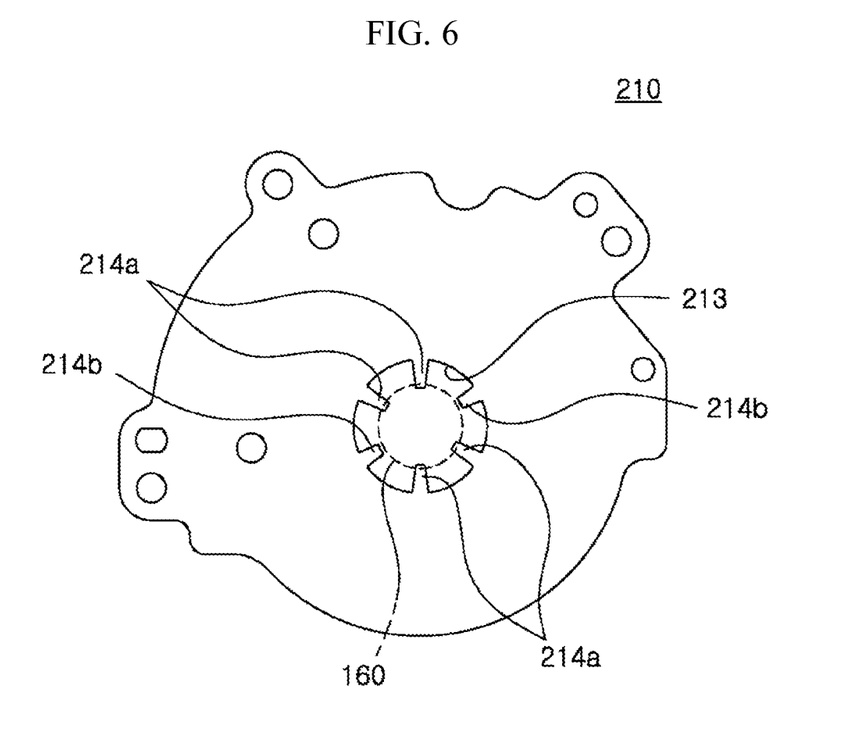
FIG. 6 is a plan view showing a base plate shown in FIG. 5.

FIG. 5 shows a structure of an ultra-thin spindle motor having an electrostatic discharge (ESD) path according to a second embodiment of the present invention. FIG. 6 shows a grounding structure of a base plate shown in FIG. 5.

The ultra-thin spindle motor 100a according to the second embodiment of the present invention is substantially the same as the structure of the first embodiment, but only the structure of forming an electrostatic discharge path is different. Thus, in the second embodiment, the same components as those of the first embodiment are given by the same reference numerals, and the detailed description thereof will be omitted.

According to a difference between the second embodiment and the first embodiment, the first protrusion 114a of the base plate 110 is made to contact the lower surface of the metal bearing 160 to thus form the electrostatic discharge path P1, in the first embodiment, but the four first protrusions 214a of the base plate 210 are made to contact the outside of the lower side of the metal bearing 160 to thus form the electrostatic discharge path P2, in the second embodiment.

Accordingly, the base plate 210 of the second embodiment is preferably made to be flat as a whole, and the distal ends of the four first protrusions 214a that are disposed radially toward the center of the through-hole 213 along the inner circumference of the through hole 213 are formed to contact the outer circumference of the lower side of the metal bearing 160.

To this end, when the base plate 210 is insert-molded and integrated with the bearing housing 220, the distal end of the first protrusion 214a is established to be exposed to the first recess 121 of the bearing housing 220. As a result, if the metal bearing 160 is press-fitted into the first recess 121 of the bearing housing 220 and then press-fitted to the slit washer 152 that is provided on the bottom 123 of the first recess 121, the outer circumference of the lower side of the metal bearing 160 is made to naturally contact the distal end of the first protrusion 214a.

In the second embodiment, like the first embodiment, four first protrusions 214a are in contact with the metal bearing 160 and the remaining two second protrusions 214b are formed shorter than the first protrusions 214a to thus be in non-contact with the metal bearing 160. In this case, in the second embodiment, the first protrusions 214a that are made to be in contact with the metal bearing 160 are set to four, but are not limited to four, Forming at least one first protrusion 214a may suffice.

Figure 7:
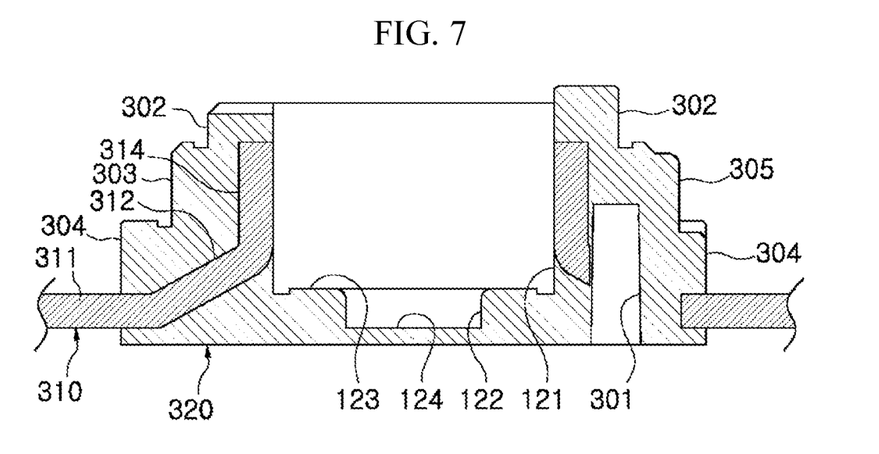
FIG. 7 is an axial cross-sectional view showing a coupling structure of a bearing housing and a base plate that are used in an ultra-thin spindle motor having an electrostatic discharge (ESD) path according to a third embodiment of the present invention.
Figure 8:
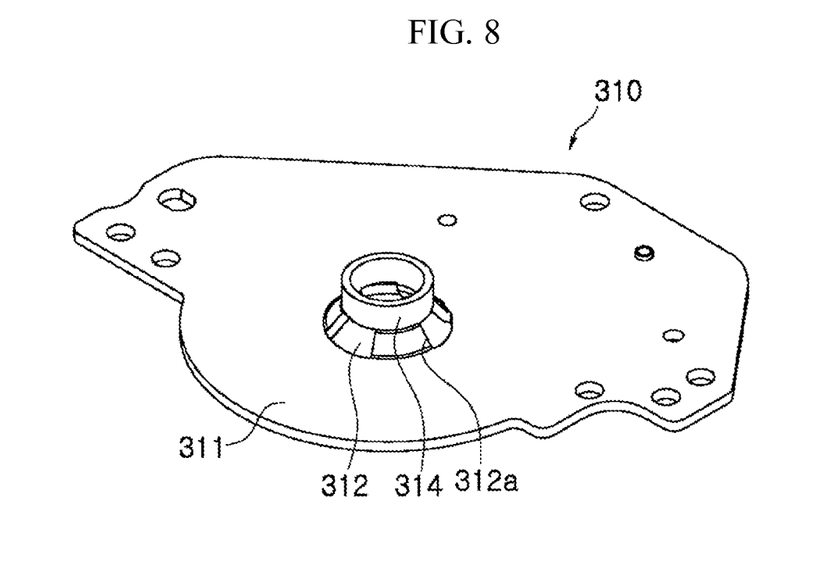
FIG. 8 is a perspective view showing the base plate shown in FIG. 7.

FIG. 7 is an axial cross-sectional view showing a coupling structure of a bearing housing and a base plate that are used in an ultra-thin spindle motor having an electrostatic discharge (ESD) path according to a third embodiment of the present invention. FIG. 8 is a perspective view showing the base plate shown in FIG. 7.

As shown in FIGS. 7 and 8, a base plate 310 that is applied to an ultra-thin spindle motor 310 having an electrostatic discharge (ESD) path according to the third embodiment of the present invention differs somewhat from those of the first and second embodiments, in view of a structure of the inner tip combined with a metal bearing 160.

In the first embodiment, the first protrusion 114a of the base plate 110 is in contact with the lower surface of the metal bearing 160, to thus form the electrostatic discharge path P1, and in the second embodiment, the four first protrusions 214a of the base plate 210 are in contact with the outside of the lower side of the metal bearing 160, to thus form the electrostatic discharge path P2, but in the third embodiment, the coupling ring 314 that is located at the tip of the inner side of the base plate 310 has a predetermined length and is press-fitted with the outer circumference of the lower side of the metal bearing 160, to thus form the electrostatic discharge path.

For this, the base plate 310 of the third embodiment is made flat as a whole, but a tilt portion 312 is primarily bent obliquely at a predetermined angle from a flat portion 311, and then the coupling ring 314 that is extended from the tilt portion 312 is secondarily bent so as to be set perpendicularly with respect to the flat portion 311.

In addition, the tilt portion 312 is formed of for example, three holes 312a in order to form an empty recess 301 When the bearing housing 320 is injection-molded with a resin, and the coupled ring 314 is formed to be cylindrical to expand a contact area of the bearing.

In this case, the coupling ring 314 may be bent and molded to the flat portion 311 without passing through the tilt portion 312.

When the bearing housing 320 is injection-molded with a resin, the base plate 310 is integrated with the bearing housing 320, by insert-molding to the inside of the base plate 310, and the inner circumferential surface of the coupling ring 314 is set to be exposed while matching the first recess 121 of the bearing housing 320. As a result, if the metal bearing 160 is press-fitted into the first recess 121 of the bearing housing 320 and then is press-fitted to the slit washer 152 that is provided on the bottom surface 123 of the first recess 121, the outer circumference of the lower side of the metal bearing 160 is naturally press-fitted and coupled with the coupling ring 314 of the base plate 310.

As described above, since the coupling ring 314 of the base plate 310 has the structure of having a certain length and of being extended in the vertical direction, in the third embodiment, a coupling area of the base plate 310 with respect to the metal bearing 160 increases and thus a coupling force between the base plate 310 and the metal bearing 160 can be made stronger than that of the second embodiment, to thereby increase durability.

As a result, the metal hearing 160 is assembled perpendicularly with the coupling ring 314 of the base plate 310, to thus secure verticality of the rotating shaft and simultaneously secure an electrostatic discharge path.

In addition, the bearing housing 320 includes a first diameter portion 302, a second diameter portion 303 and a third diameter portion 304 whose outer circumferential surfaces have mutually different diameters, respectively. The stator 140 of FIG. 3 or 5 is coupled on the second diameter portion 303. In addition, a number of protrusions 305 that guide a coupling position with the stator are formed in the second diameter portion 303, and a number of coupling grooves are provided on the inner circumference of the stator 140 in correspondence to the number of protrusions 305.

The bearing housing 320 includes a first recess 121 accommodating the metal bearing 160 and a second recess 122 that supports the other end of the rotating shaft 150, on the inner circumference of the bearing housing 320. In addition, a number of guide grooves are formed as part of an oil circulation path through which an oil that leaks from the metal bearing 160 when the rotor rotates at a high speed is circulated on the bottom surfaces 123 and 124 of the first and second recesses 121 and 122.

The metal bearing 160 is for example, an oilless bearing made of oil-containing sintered metal that is formed by impregnating oil into a porous copper alloy (i. e., brass system).

The spindle motor minimizes friction between the rotating shaft 150 and the metal bearing 160 since oil is circulated in the bearing housing 120 or 320 during high speed rotation of the rotor.

As described above, the present invention maintains verticality of a bearing and a rotating shaft and essentially blocks leaks of a bearing oil, through a bearing housing of a resin molding structure, as well as includes a ground structure for discharging static electricity so that the electric charges that are passed into the interior of the spindle motor 100 or 100a from the rotating shaft 150 due to the externally introduced static electricity naturally move a main body of a disc drive unit through a number of first protrusions or 214a or coupling ring 314 of the base plate 110, 210, or 310 contacting the metal bearing 160, to thereby prevent in advance a drive IC of a motor drive circuit from malfunctioning, or the motor from stopping due to the external electric charges.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

[Industrial Applicability]

The present invention relates to a spindle motor having an electrostatic discharge path, including a rotor and a chucking device and including a rotating body on the central portion of which a rotating shaft is coupled, and a fixed body that rotatably supports the rotating shaft of the rotating body, in which a bearing housing of the fixed body is insert-molded or insert-injection-molded and integrated with a base plate when the bearing housing of the fixed body is formed, to thus secure verticality of a bearing and a rotating shall and stably discharge the electric charges to the outside of a disc drive unit through the base plate, and may be applied to a hard disc drive (HDD), an optical disc drive (ODD) and other recording medium disc drives requiring high-speed rotation.

The invention claimed is:

1. A spindle motor comprising:
a rotor to the central portion of which one end of a rotating shaft is coupled;
a bearing that rotatably supports the rotating shaft;
a bearing housing that accommodates the bearing in the inside of a groove and that is made of a resin; and
a base plate whose inner circumferential portion is buried and combined in the inside of the bearing housing,
wherein part of the base plate is in contact with the bearing to thus discharge externally introduced static electricity through the rotating shaft, the bearing, and the base plate, and
wherein the base plate comprises a plurality of protrusions projected from the inner circumferential surface of a through-hole formed in the base plate, to increase a bonding force to the bearing housing when the base plate is insert-molded into the bearing housing, and wherein at least one of the plurality of protrusions is in contact with the bearing.

2. The spindle motor according to claim 1, wherein part of the base plate is in contact with the bottom of the bearing or the outer circumference of the lower end of the bearing.

3. The spindle motor according to claim 1, wherein the at least one protrusion in contact with the bearing is in contact with the bottom surface of the bearing or the outer circumference of the lower end of the bearing.

4. The spindle motor according to claim 1, wherein the bearing housing comprises a first recess accommodating the bearing in the inner circumference thereof, and a second recess that supports the other end of the rotating shaft.

5. The spindle motor according to claim 1, wherein the base plate comprises:
a flat portion that is fixed on a main body of a disc drive unit; and
a coupling ring that is bent upwardly from the inner end of the flat portion and whose inner circumferential surface is exposed to a recess of the bearing housing and in which the lower side of the bearing is press-fitted and coupled.

6. The spindle motor according to claim 5, further comprising a tilt portion that is bent obliquely from the flat portion to connect the flat portion with the coupling ring, in which a through-hole is formed to form a slimming recess when the bearing housing is injection-molded with a resin.

7. A spindle motor comprising:
a rotor to the central portion of which one end of a rotating shaft is coupled;
a bearing that rotatably supports the rotating shaft;
a bearing housing that accommodates the bearing in the inside of a groove and that is made of a resin; and
a base plate whose inner circumferential portion is buried and combined in the inside of the bearing housing,
wherein part of the base plate is in contact with the bearing to thus discharge externally introduced static electricity through the rotating shaft, the bearing, and the base plate; and
wherein the base plate comprises:
a flat portion that is fixed on a main body of a disc drive unit; and
an extension portion that is bent upwardly from the flat portion and then extended in parallel to the flat portion to increase a bonding force for the bearing housing, and
wherein the extension portion comprises a number of protrusions that are contact with the bearing and that are projected from the inner circumferential surface of a through-hole formed at the center thereof.

8. The spindle motor according to claim 7, wherein the protrusions are set at the same level as that of a slit washer to prevent the rotating shaft from seceding from the bearing.

* * * * *